United States Patent
O'Brien et al.

(10) Patent No.: US 8,919,621 B2
(45) Date of Patent: Dec. 30, 2014

(54) AERODYNAMIC UNDERBODY SPARE TIRE COVER

(71) Applicant: Magna International Inc., Aurora (CA)

(72) Inventors: Timothy F. O'Brien, White Lake, MI (US); Bradley R. Hamlin, Canton, MI (US)

(*) Notice: Subject to any disclaimer, the term of this patent is extended or adjusted under 35 U.S.C. 154(b) by 0 days.

(21) Appl. No.: 13/714,655

(22) Filed: Dec. 14, 2012

(65) Prior Publication Data

US 2013/0313293 A1 Nov. 28, 2013

Related U.S. Application Data

(60) Provisional application No. 61/576,435, filed on Dec. 16, 2011.

(51) Int. Cl.
*B62D 43/00* (2006.01)
*B62D 43/04* (2006.01)

(52) U.S. Cl.
CPC .............. *B62D 43/005* (2013.01); *B62D 43/04* (2013.01)
USPC ...................... 224/42.23; 224/42.2; 224/42.21

(58) Field of Classification Search
CPC ........................................................ B62D 43/04
USPC .................... 224/42.23, 42.2, 42.21
See application file for complete search history.

(56) References Cited

U.S. PATENT DOCUMENTS

| | | | |
|---|---|---|---|
| 2,051,082 A * | 8/1936 | Hansen et al. | 280/152.05 |
| 4,548,540 A * | 10/1985 | Renfro | 414/463 |
| 6,327,030 B1 | 12/2001 | Ifju et al. | |
| 6,336,671 B1 * | 1/2002 | Leonardi | 296/37.3 |
| 6,399,693 B1 | 6/2002 | Brennan et al. | |
| 6,648,577 B2 * | 11/2003 | Obriot | 414/463 |
| 6,667,368 B1 | 12/2003 | Brennan et al. | |
| 6,941,802 B2 * | 9/2005 | Brown | 73/146 |
| 7,117,807 B2 | 10/2006 | Bohn, Jr. et al. | |
| 7,143,709 B2 * | 12/2006 | Brennan et al. | 114/222 |
| 7,169,853 B2 | 1/2007 | Brennan et al. | |
| 7,347,970 B2 | 3/2008 | Kim et al. | |
| 7,487,952 B2 * | 2/2009 | Murphy | 254/323 |
| 7,650,848 B2 | 1/2010 | Brennan et al. | |
| 7,770,764 B2 * | 8/2010 | Rock et al. | 224/42.23 |
| 2006/0219143 A1 | 10/2006 | Brennan et al. | |
| 2010/0089335 A1 * | 4/2010 | DelaBarre | 119/497 |
| 2010/0119755 A1 | 5/2010 | Chung et al. | |
| 2010/0126404 A1 | 5/2010 | Brennan et al. | |
| 2010/0226943 A1 | 9/2010 | Brennan et al. | |
| 2011/0311769 A1 | 12/2011 | Chen et al. | |

OTHER PUBLICATIONS

O'Brien et al.; Aerodynamic Underbody Spare Tire Cover; unpublished U.S. Appl. No. 13/744,813, filed Jan. 18, 2013.

* cited by examiner

*Primary Examiner* — Justin Larson
*Assistant Examiner* — Lester L Vanterpool
(74) *Attorney, Agent, or Firm* — Warn Partners, P.C.

(57) ABSTRACT

A spare tire assembly which includes a spare tire or under mount frame, a spare tire, and a cover. The assembly may optionally include an electric winch, and a jack. The cover is connected to the under mount frame when assembled to the vehicle, and is disconnected from the under mount frame when the spare tire is needed. The cover has dimples which improve air flow underneath the vehicle. The cover is made of different sizes to be used with different size spare tires for different types of vehicles, such as trucks, sport utility vehicles, and vans.

17 Claims, 4 Drawing Sheets

AERODYNAMIC UNDERBODY SPARE TIRE COVER

CROSS-REFERENCE TO RELATED APPLICATIONS

This application claims the benefit of U.S. Provisional Application No. 61/576,435, filed Dec. 16, 2011.

FIELD OF THE INVENTION

The present invention relates to a modular spare tire cover for a vehicle, where the spare tire cover improves fuel economy by reducing weight and improving aerodynamics.

BACKGROUND OF THE INVENTION

Spare tires are included with almost every vehicle manufactured today. While most cars have trunk space in which the spare tire is located, other types of vehicles, such as, trucks, sport utility vehicles, and certain types of vans have the spare tire located underneath the vehicle, and attached to the frame through some type of mounting system.

However, the equipment used to stow the spare tire increases the overall weight of the vehicle, and, depending upon the placement of the tire, may also have an effect of the aerodynamics of the vehicle, reducing fuel economy.

Accordingly, there exists a need for equipment used to stow a spare tire which is of a reduced weight, and has a minimal effect on the aerodynamics of the vehicle, improving fuel economy.

SUMMARY OF THE INVENTION

The present invention is directed to a spare tire which is mounted underneath a vehicle. The spare tire is part of an assembly which includes a spare tire frame, a spare tire, and a cover. The assembly may optionally include an electric winch, and a jack. The cover has dimples which improve air flow underneath the vehicle. The cover is made in different sizes to be used with different size spare tires for different types of vehicles, such as trucks, sport utility vehicles, and vans.

Another embodiment of the invention includes a cover sold separately from the vehicle, and installed by the purchaser or the dealer.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
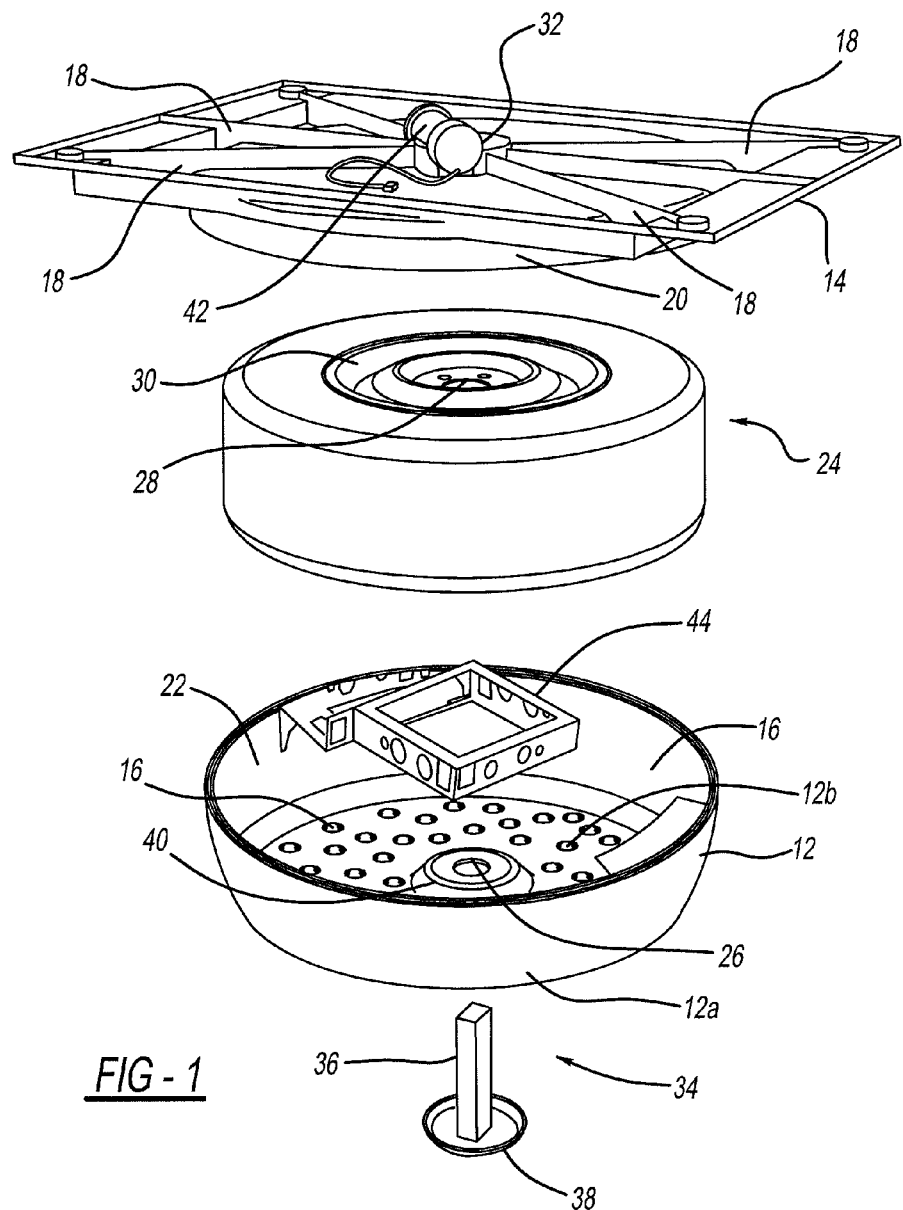
FIG. 1 is a first exploded view of a spare tire and cover assembly, according to a first embodiment of the present invention.
Figure 2:
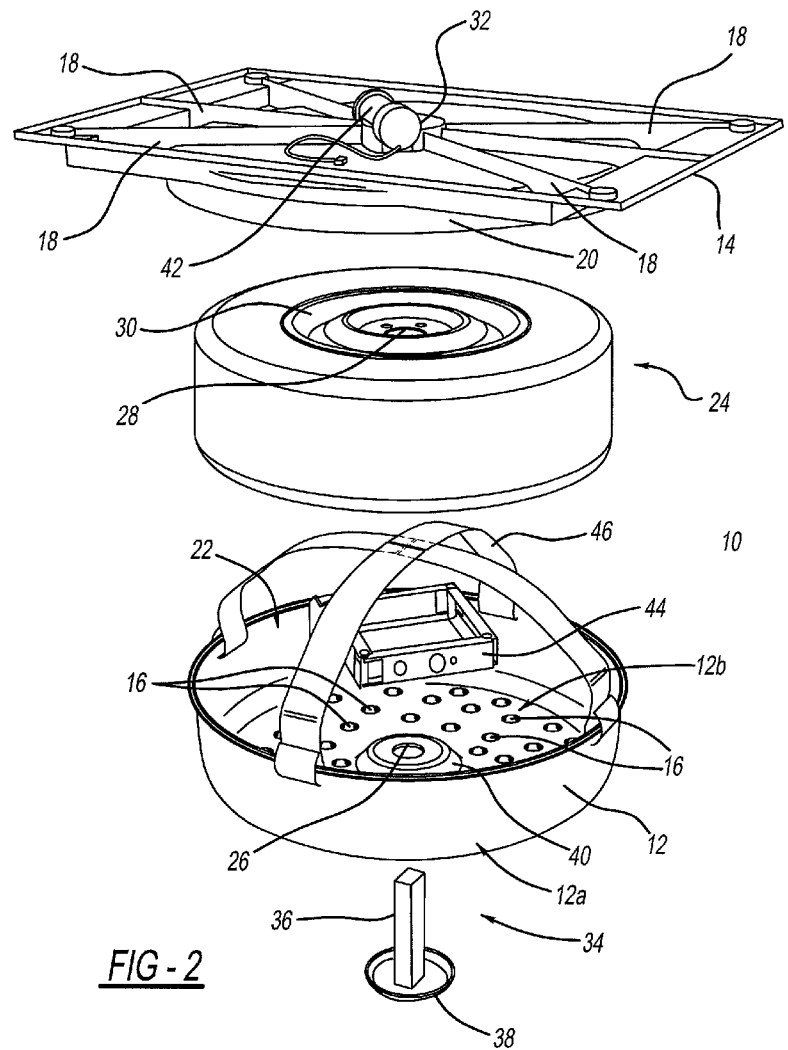
FIG. 2 is a second exploded view of a spare tire and cover assembly, according to a first embodiment of the present invention.

An embodiment of an aerodynamic underbody spare tire assembly is shown in the FIGS. 1-2 generally at 10. The assembly 10 is used for storing a spare tire underneath a vehicle, while improving fuel economy by improving air flow underneath the vehicle and reducing the weight of the vehicle. The assembly 10 includes a cover 12, and an under mount frame 14. The cover 12 is generally hemispherical in shape, and includes several detents, or "dimples" 16. The dimples 16 are also generally hemispherical in shape, and improve air flow underneath the vehicle, reducing wind drag and therefore improving fuel economy.

The frame 14 is attached underneath the vehicle, and may be connected to the vehicle frame, or molded as part of the vehicle frame. The frame 14 includes several cross members 18, which provide the frame 14 with added strength. The frame 14 also includes an outer lip 20 which corresponds to the shape of the cover 12, and when the cover 12 is connected to the frame 14, the interior cavity, shown generally at 22, of the cover 12 is closed off from the outside environment, keeping a spare tire, shown generally at 24, protected from exposure to the outside environment. In the embodiment shown the outer lip 20 goes around the circumference of the cover 12. However, it is also within the scope of the present invention to have the cover 12 fit outside the outer lip 20 The assembly 10 is operable to be changed between a stowed position, where the tire 24 and cover 12 are assembled to the vehicle, and a deployed position, where the tire 24 and cover 12 are detached from the frame 14, and the tire 24 is used to replace a flat tire.

Integrally formed with the cover 12 are a side wall 12a for extending around the outer periphery of a spare tire and a circular portion 12b attached to the side wall 12a for forming a continuous outer aerodynamic housing encompassing the entire tire within the outer cover is a lower aperture 26, which is in substantial alignment with an aperture 28 formed as part of the rim 30 of the tire 24. The lower aperture 26 is also in substantial alignment with an upper aperture 32 formed as part of the frame 14. When the assembly 10 is in the stowed position, a support member, shown generally at 34, extends through each of the apertures 26,28,32. More specifically, the support member 34 includes a post member 36 and a plate member 38, where the plate member 38 is substantially circular in shape. The plate member 38 is approximately the same diameter as an indented portion 40 formed as part of the cover 12, and the aperture 26 is formed as part of the indented portion 40.

Mounted to the frame 14 is an actuator, which in this embodiment is an electric winch 42, the electric winch 42 includes a cable (not shown) which extends through the upper aperture 32, the aperture 28, through a tire jack 44, and the lower aperture 26 and selectively connects to the post member 36. When it is desired to stow the tire 24 underneath the vehicle, the cable is connected to the post member 36 and the winch 42 is activated to pull on the cable, and therefore pull the cable toward and the support member 34 toward the frame 14. As this occurs, the post member 36 is pulled through the lower aperture 26, the tire jack 44, the aperture 28, and through the upper aperture 32, and the plate member 38 is received in the indented portion 40. The post member 36 is substantially rigid, and keeps the various components of the assembly from moving and shifting when the assembly 10 is attached to the vehicle.

If the spare tire 24 is needed, the winch 42 is activated to loosen the cable, and allow the support member 34 to move away from the frame 14. The winch 42 may be connected electronically to a switch inside the vehicle or at some other location on the vehicle. As the support member 34 is lowered, the cover 12, jack 44, and tire 24 are lowed as well. Once the support member 34 is lowered enough, and there is enough slack in the cable, the cable is detached from the post member 36, allowing the spare tire 24 and the jack 44 to be removed from the cover 12.

When the assembly 10 is attached to the vehicle, the dimples 16 improve the airflow underneath the vehicle, improving fuel economy. Additionally, the cover 12, frame 14, and support member 34 are made of a lightweight composite material, reducing the overall weight of the vehicle, further improving fuel economy. Preferably, the material used is a recycled thermoplastic material derived from regrinds from automotive part productions. In other embodiments, the cover 12 is made of different sizes to be used with different size tires.

Figure 3:
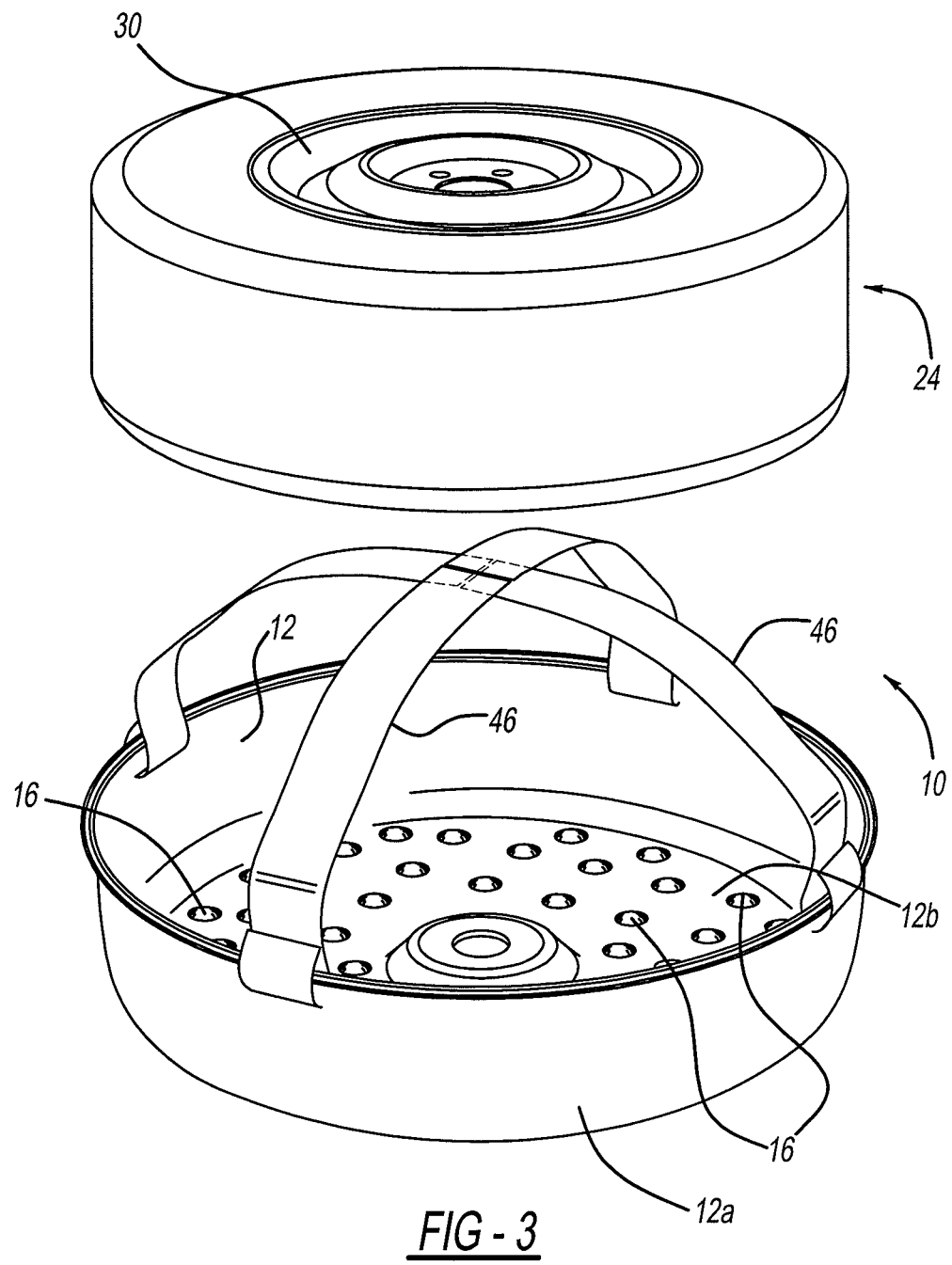
FIG. 3 is a first exploded view of a spare tire and cover assembly, according to a second embodiment of the present invention.
Figure 4:
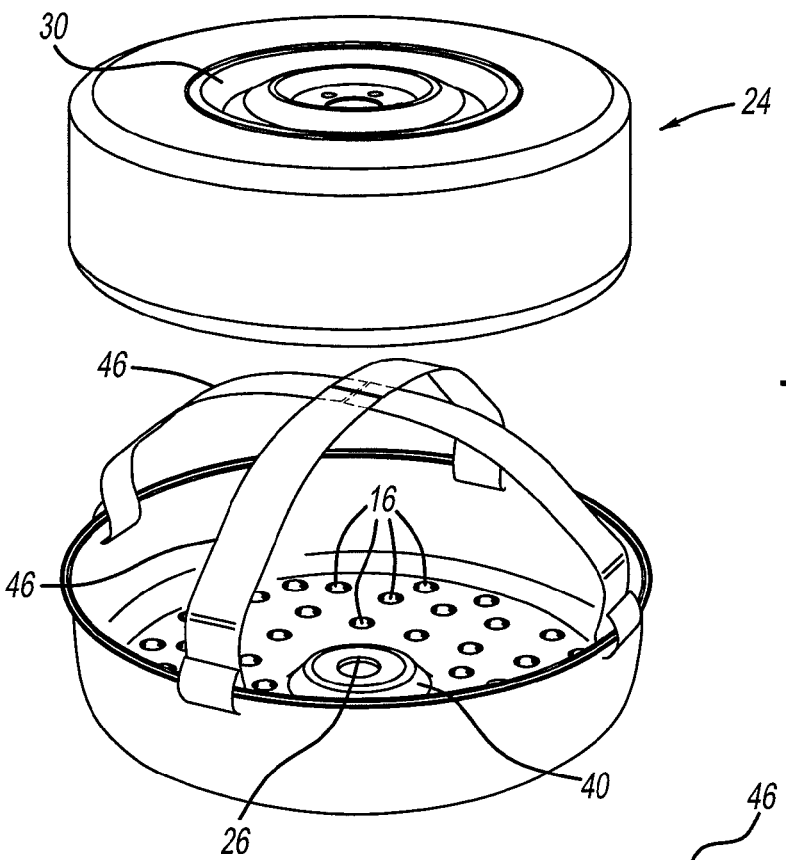
FIG. 4 is a second exploded view of a spare tire and cover assembly, according to a first embodiment of the present invention.
Figure 5:
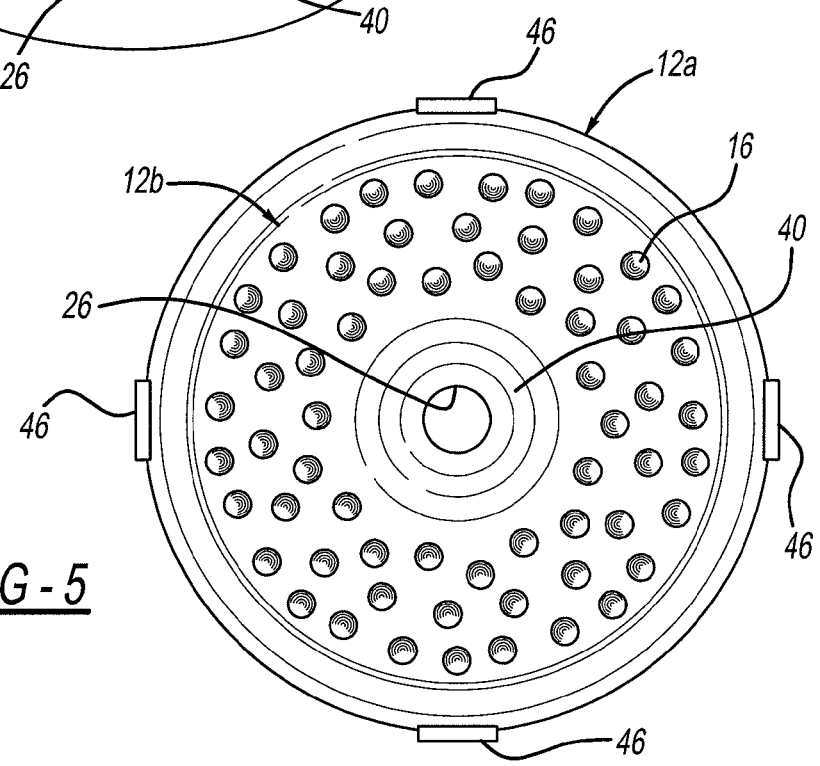
FIG. 5 is a bottom view of the spare tire and cover assembly in accordance with the present invention.

A second embodiment of the present invention is shown in FIGS. 3-4, with like numbers referring to like elements. In this embodiment, instead of the support member 34 and the winch 42, there is a plurality of straps 46; more specifically, there are two straps 46 attached to the cover 12. The straps 46 secure the tire 24 in the cover 12, and also are used to secure the cover 12 to the vehicle. The embodiment shown in FIGS. 3-4 may be sold separately from the vehicle, such as an aftermarket product. The second embodiment also includes the dimples 16 for improving airflow underneath the vehicle, reducing wind drag, and improving fuel economy. Alternatively, in addition to providing dimples aeorodynamically enhancing surfaces or coatings are used for additional reduction in losses due to wind drag on the housing. For instance Sharklet™ materials or surface treatments are used on the exposed surface of the housing. Sharklet film materials are available from Sharklet Technologies, Inc. Aurora Colo. Alternatively, aerodynamic surface treatment patterns and/or micro topogrophies, such as shown in U.S. Pat. No. 7,143,709 B2 to Brennan et al. (the disclosure of which is hereby incorporated herein by reference), are formed in the mold used to manufacture the cover such that the molded cover includes an aerodynamically enhanced surface which is used to reduce the surface drag of the cover.

If desired, the straps 46 may also optionally be incorporated into the first embodiment, shown in FIG. 2, to allow the spare tire 24 and cover 12 to be removed from the vehicle and carried from one location to the next. Suitable handles for carrying of the tire may also be molded in the cover if desired.

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. A spare tire assembly for a vehicle, comprising:
   an under mount frame connected to a vehicle;
   a cover operably connected to said under mount frame;
   a spare tire supported by said cover;
   an actuator connected to said under mount frame;
   a support member operable with said actuator for securing said cover to said under mount frame;
   a lower aperture formed as part of said cover;
   an aperture formed as a rim, said rim being part of said spare tire;
   an upper aperture formed as part of said under mount frame;
   wherein at least a portion of said support member extends through said lower aperture, said aperture, and said upper aperture when said cover is attached to said under mount frame;
   a post member operable for extending through said lower aperture, said aperture, and said upper aperture when said cover is attached to said under mount frame;
   a plate member connected to said post member, said plate member in contact with said cover and supporting said cover when said cover is attached to said under mount frame; and
   an indented portion formed as part of said cover, said upper aperture formed as part of said indented portion, and said plate member is received into said indented portion when said cover is attached to said under mount frame.

2. The spare tire assembly for a vehicle of claim 1, further comprising:
   a cavity formed as part of said cover;
   wherein said spare tire is disposed in said cavity when said cover is attached to said under mount frame.

3. The spare tire assembly for a vehicle of claim 1, further comprising a tire jack disposed between said spare tire and said cover.

4. The spare tire assembly for a vehicle of claim 1, further comprising an aerodynamic surface treatment on the exposed surface of the cover comprising at least one dimple integrally formed as part of said cover, said at least one dimple operable for improving air flow underneath said vehicle.

5. The spare tire assembly for a vehicle of claim 1, said actuator further comprising an electric winch connected to said under mount frame.

6. The spare tire assembly for a vehicle of claim 1 further comprising at least one strap attached to the cover for retaining the cover on the tire.

7. The spare tire assembly for a vehicle of claim 1 further comprising a pair of straps crossing one another for securing the cover onto the spare tire.

8. The spare tire assembly for a vehicle of claim 1 wherein the cover is made of a recycled polymer material.

9. The spare tire assembly for a vehicle of claim 1 wherein the surface of the cover includes an aerodynamically enhanced surface comprising and integrally molded surface topography for reducing air drag moving across the cover.

10. The spare tire assembly for a vehicle of claim 1 wherein the cover is continuous for covering the entire tire within it without gaps.

11. The spare tire assembly for a vehicle of claim 4 wherein said dimples are on the surface of the cover.

12. The spare tire assembly for a vehicle of claim 1 wherein the dimples are over the entire surface of the cover.

13. A vehicle including an aerodynamic spare tire comprising:
   an under mount frame connected to the vehicle;
   a cover operably connected to said under mount frame;
   a spare tire supported underneath the vehicle within said cover;
   an actuator connected to said under mount frame;
   a support member operable with said actuator for securing said cover to said under mount frame;
   a lower aperture formed as part of said cover;

an aperture formed as a rim, said rim being part of said spare tire;

an upper aperture formed as part of said under mount frame;

wherein at least a portion of said support member extends through said lower aperture, said aperture, and said upper aperture when said cover is attached to said under mount frame;

a post member operable for extending aperture, said aperture, and said upper aperture when said cover is attached to said under mount frame;

a plate member connected to said post member, said plate member in contact with said cover and supporting said cover when said cover is attached to said under mount frame; and an indented portion formed as part of said cover, said upper aperture formed as part of said indented portion, and said plate member is received into said indented portion when said cover is attached to said under mount frame.

14. The vehicle of claim 13 further comprising the cover and undermount frame being injection molded from a recycled automotive regrind material.

15. The vehicle of claim 13 wherein the outer surface of the cover includes an aerodynamically enhanced outer surface.

16. A spare tire assembly removably mounted to a vehicle in an exposed location comprising:

an outer cover assembly Including a side wall for extending around the outer periphery of a spare tire and a circular portion attached to the side wall for forming a continuous outer aerodynamic housing encompassing the entire tire within the outer cover;

at least one attachment strap attached across the wall in a radial manner for securing of the tire in the outer cover assembly, said at least one attachment strap allowing for securing and carry of the tire after the tire has been disengaged with the vehicle;

an under mount frame connected to the vehicle;

an actuator connected to said under mount frame;

a support member operable with said actuator for securing said outer cover assembly to said under mount frame;

a lower aperture formed as part of said outer cover assembly;

an aperture formed as a rim, said rim being part of said spare tire;

an upper aperture formed as part of the under mount frame;

wherein at least a portion of said support member extends through said lower aperture, said aperture, and said upper aperture when said outer cover assembly is attached to said under mount frame;

a post member operable for extending through said lower aperture, said aperture, and said upper aperture when said outer cover assembly is attached to said under mount frame;

a plate member connected to said post member, said plate member in contact with said cover and supporting said outer cover assembly when said outer cover assembly is attached to said under mount frame; and an indented portion formed as part of said outer cover assembly, said upper aperture formed as part of said indented portion, and said plate member is received into said indented portion when said cover is attached to said under mount frame.

17. The spare tire assembly of claim 16 further comprising at least two straps radially attached to the side wall and crossing near the central portion of the cover.

* * * * *

UNITED STATES PATENT AND TRADEMARK OFFICE
CERTIFICATE OF CORRECTION

| | | |
|---|---|---|
| PATENT NO. | : 8,919,621 B2 | Page 1 of 1 |
| APPLICATION NO. | : 13/714655 | |
| DATED | : December 30, 2014 | |
| INVENTOR(S) | : Timothy F. O'Brien and Bradley R. Hamlin | |

It is certified that error appears in the above-identified patent and that said Letters Patent is hereby corrected as shown below:

Claims

Column 5, Line 9, Claim 13

Please insert --through said lower-- between "extending" and "aperture".

Signed and Sealed this
Thirty-first Day of May, 2016

Michelle K. Lee
*Director of the United States Patent and Trademark Office*